United States Patent [19]
Long et al.

[11] Patent Number: 5,943,365
[45] Date of Patent: *Aug. 24, 1999

[54] DEVICE, SYSTEM, AND METHOD FOR MODEM COMMUNICATION UTILIZING DC OR NEAR-DC SIGNAL SUPPRESSION

[75] Inventors: Guozhu Long; Gunnar Holm, both of Raleigh, N.C.

[73] Assignee: Cirrus Logic, Inc., Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/746,356

[22] Filed: Nov. 8, 1996

Related U.S. Application Data

[63] Continuation-in-part of application No. 08/731,494, Oct. 16, 1996.

[51] Int. Cl.[6] .............................. H04B 1/38; H04L 27/00
[52] U.S. Cl. ............................................. 375/222; 375/259
[58] Field of Search .................................... 375/200, 222, 375/219, 296, 259; 370/384, 295; 379/90.1; 395/200.3; 341/58

[56] References Cited

U.S. PATENT DOCUMENTS

| | | | |
|---|---|---|---|
| 3,579,123 | 5/1971 | Koga | 327/303 |
| 3,697,874 | 10/1972 | Kaneko | 325/38 |
| 3,753,113 | 8/1973 | Maruta et al. | 325/38 |
| 3,754,237 | 8/1973 | de Laage de Meux | 340/347 |
| 4,464,765 | 8/1984 | Shimizu | 375/17 |
| 5,166,958 | 11/1992 | Shimokoriyama et al. | 375/292 |
| 5,461,641 | 10/1995 | Abbiate et al. | 375/243 |
| 5,671,251 | 9/1997 | Blackwel et al. | 375/222 |

FOREIGN PATENT DOCUMENTS

| | | | |
|---|---|---|---|
| 0065 849 | 12/1982 | European Pat. Off. | H04L 25/49 |
| 0691 750 | 1/1996 | European Pat. Off. | H03M 7/20 |
| WO96/18261 | 6/1996 | WIPO | H04M 11/00 |

*Primary Examiner*—Chi H. Pham
*Assistant Examiner*—Khai Tran
*Attorney, Agent, or Firm*—J. P. Violette; Robert P. Sabath

[57] ABSTRACT

Modem technology is implemented in a system including a personal computer (PC) to enable communication over a PSTN using communication software which includes a DC and near-DC signal suppresser.

6 Claims, 7 Drawing Sheets

DEVICE, SYSTEM, AND METHOD FOR MODEM COMMUNICATION UTILIZING DC OR NEAR-DC SIGNAL SUPPRESSION

This application is a continuation-in-part of application Ser. No. 08/731,494, filed Oct. 16, 1996, now pending, inventors Gouzhu Long and Gunnar Holm, titled Device, System, and Method for Modem Communication Utilizing DC or Near-DC Signal Suppression.

1. FIELD OF THE INVENTION

This invention relates generally to a modem device, modem-based system and method for signal communication, and more particularly to high speed modem communication utilizing dc or near-dc signal suppression.

2. BACKGROUND OF THE INVENTION

Certain known conventional modem devices, systems and methods Communicate signals between personal computers (PCs) through public switched telephone networks (PSTNs). However, DC (0 Hz) and near-DC (very low frequency) signals cannot pass through some analog circuitry utilized by various conventional modems. Typically, modems avoid transmitting data signals at DC and near-DC by modulating the baseband data signals to a passband which does not include DC and near-DC frequencies. However, some new high-speed modems try to send baseband data signals through some analog circuitry. The DC and near-DC signal components in the baseband signal are lost during the transmission. As a result, the receiving modem cannot correctly recover the transmitted data signal. It is therefore desirable to suppress DC and near-DC signals at the transmitting modem.

One method for suppressing DC signals is to apply conventional high-pass filtering techniques, however filtering increases the number of bits required to represent a signal as opposed to a nonfiltered signal. For instance, one of the simple filters for suppressing DC signals is a first-order differential encoder $(1-z^{-1})$ which has a zero at DC. Another simple filter is a second order differential encoder $(1-z^{-2})$ which has one zero at DC and another zero at 4 kHz. However, differential encoders double the dynamic range, which costs 1 bit/symbol. Thus, there remains a need for a device or method for efficient suppression of DC and near-DC signals in transmitted signals through modem-connected systems.

SUMMARY OF THE INVENTION

In accordance with the present invention, a PC for transmitting and receiving signals over a PSTN utilizes a sign-based device to suppress DC and near DC signal components. The PC includes a modem that communicates with a device, such as another PC, minicomputer, mainframe computer, FAX machine, or the internet service provider over the PSTN. The modem includes a DC signal suppresser which applies or modifies sign bits to selected, transmitted digital signal segments prior to analog conversion.

DETAILED DESCRIPTION OF THE PREFERRED EMBODIMENTS

Figure 1A:
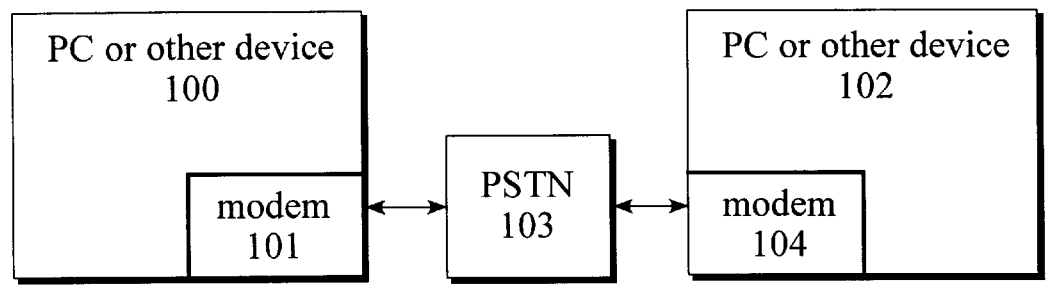
FIG. 1A is a block diagram of a PC communication system utilizing public switched telephone networks according to the present invention.

Referring to FIG. 1A, an implementation according to the present invention is shown in which PC 100 includes modem 101 and communicates with device 102, such as another PC, minicomputer, mainframe computer, FAX machine, over PSTN 103. Modem 101 may operate at a digital signal transmission/reception data rate such as 14,400 (14.4 k), 28,800 (28.8 k), 33,600 (33.6 k), 56,000 (56 k), at some symbol rate and includes DC suppresser 104 which operates by controlling a sign bit of some transmitted digital signal symbols prior to the interface to the digital network.

Figure 1B:
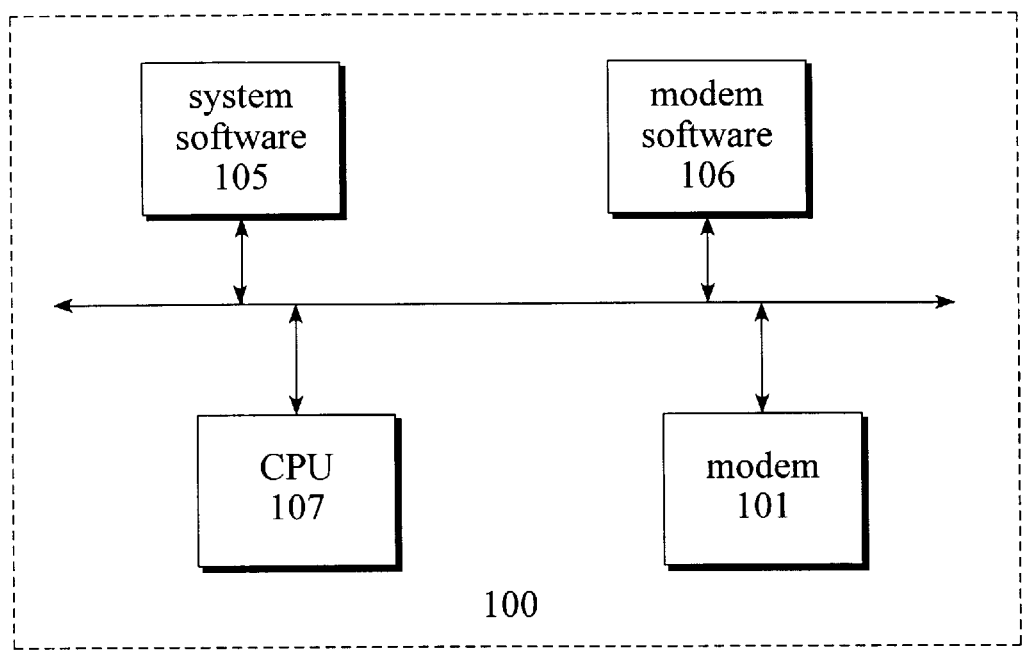
FIG. 1B is a block diagram of a PC according to the present invention.

Referring to FIG. 1B, PC 100 includes PC system software 105 and PC modem software 106 connected to central processor unit (CPU) 107 through conventional data and instruction bus 108. Modem software 106 is operated by CPU 107 to coordinate the operation of a modem controller (not shown) and direct the transmission of signals through modem 106. During operation of modem software 104 by CPU 107, digital signals, which may correspond to a screen image in the case of a data signal transmission or a block of speech in the case of an audio signal transmission, are generated and ordered into digital signal streams.

Figure 2:
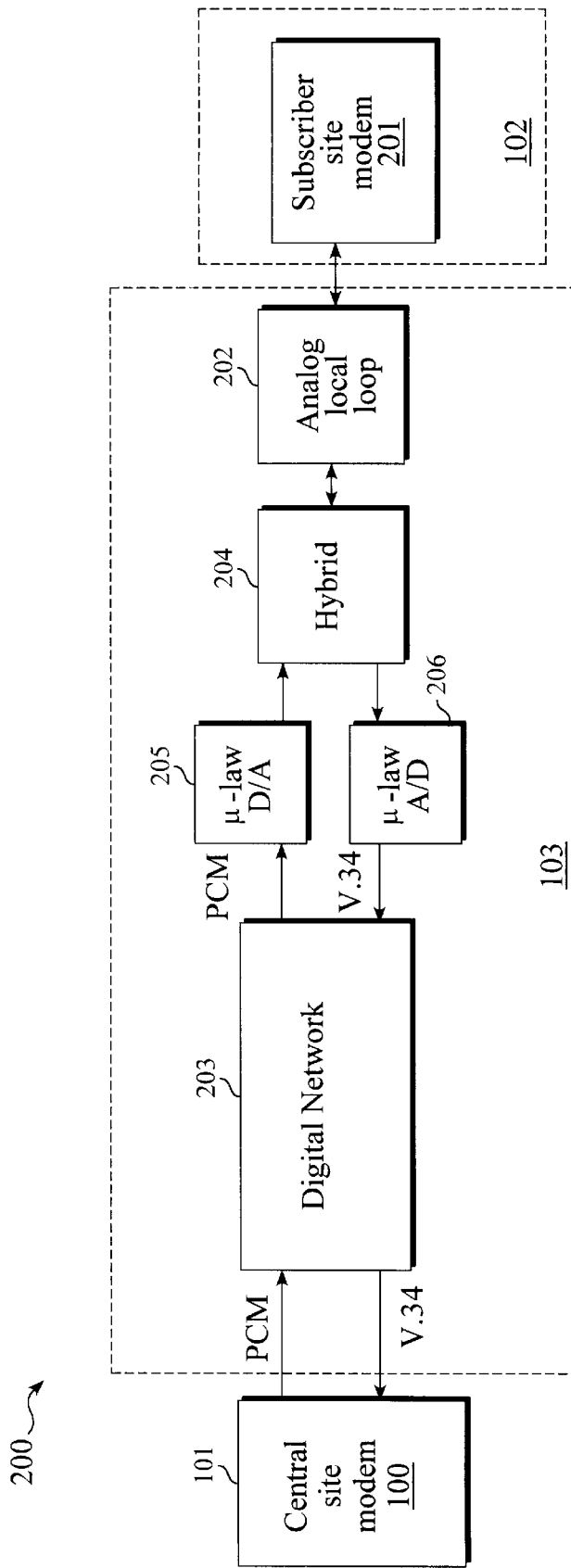
FIG. 2 is a block diagram of a 56 k modem communication system according to the present invention.

Referring to FIG. 2, baseband modem communication system 200 is Shown including 56 k modem (or PCM modem). In a PCM modem system, we refer to PC 100 as the central site which is connected to the digital PSTN Interface directly and to PC 102 as the subscriber site which is connected to the PSTN through an analog local loop. Central site modem 101 is digitally connected directly to digital network 203. Its transmitter sends a digital signal over a PCM channel through the public digital network to a central office for receiving (subscriber site) modem 201 at PC (subscriber site) 102, where it is converted into an analog signal by μ-law or A-law codec 205 (digital-to-analog converter). The analog signal is sent to local loop 202 after passing through hybrid device 204 for a 4-to-2 wire conversion, and finally reaches subscriber site modem 201.

The digital signal is typically at the sampling rate synchronized to the 8 kHz codec clock. After it is converted into an analog signal by codec 205, the analog signal is in the passband ranging from 0–4 kHz. The reverse channel from subscriber modem 201 to central modem 101 may or may not use the same scheme. For example, the V.34-type modulation scheme can be used for the reverse channel.

Figure 3:
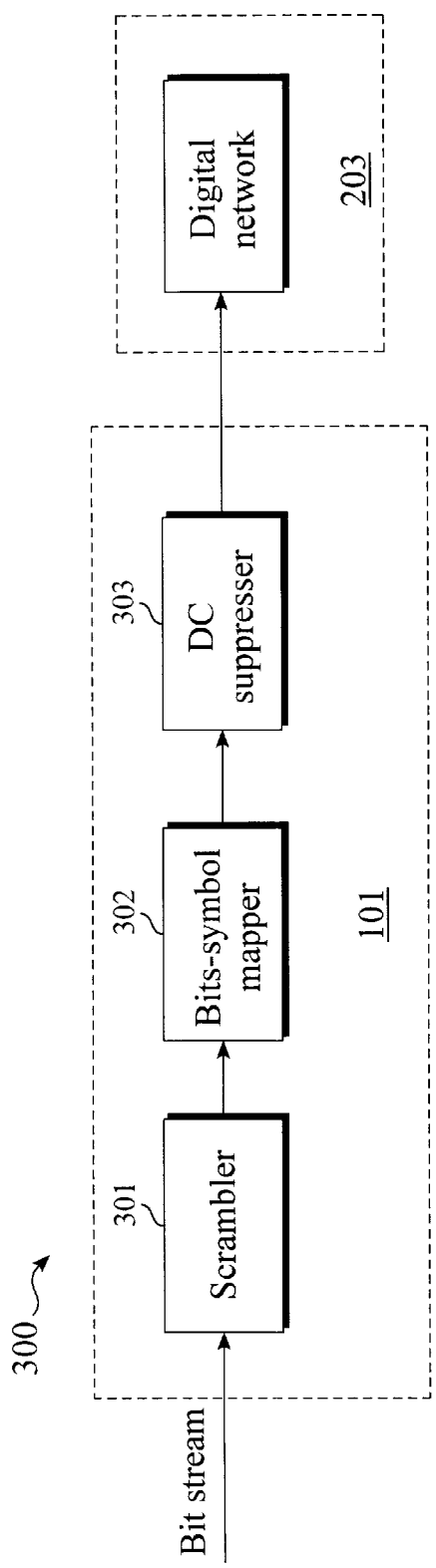
FIG. 3 is a block diagram of a transmitter for a central-site 56 k modem communication system according to the present invention.

Referring to FIG. 3, transmitter side 300 of communication system 200 is shown. On transmitter side 300, central site modem 101 receives a bit stream and instructions from PC 100 to initiate a transmission onto digital network 203. Modem 101 includes conventional scrambler 301 which scrambles the bit stream into a scrambled bit stream, conventional bits-symbol mapper 302 which maps bits from the scrambled bit stream into symbols, and DC suppresser 303 which suppresses DC and near-DC signal components before passing the symbol stream over the PCM channel onto digital network 203.

Figure 4:
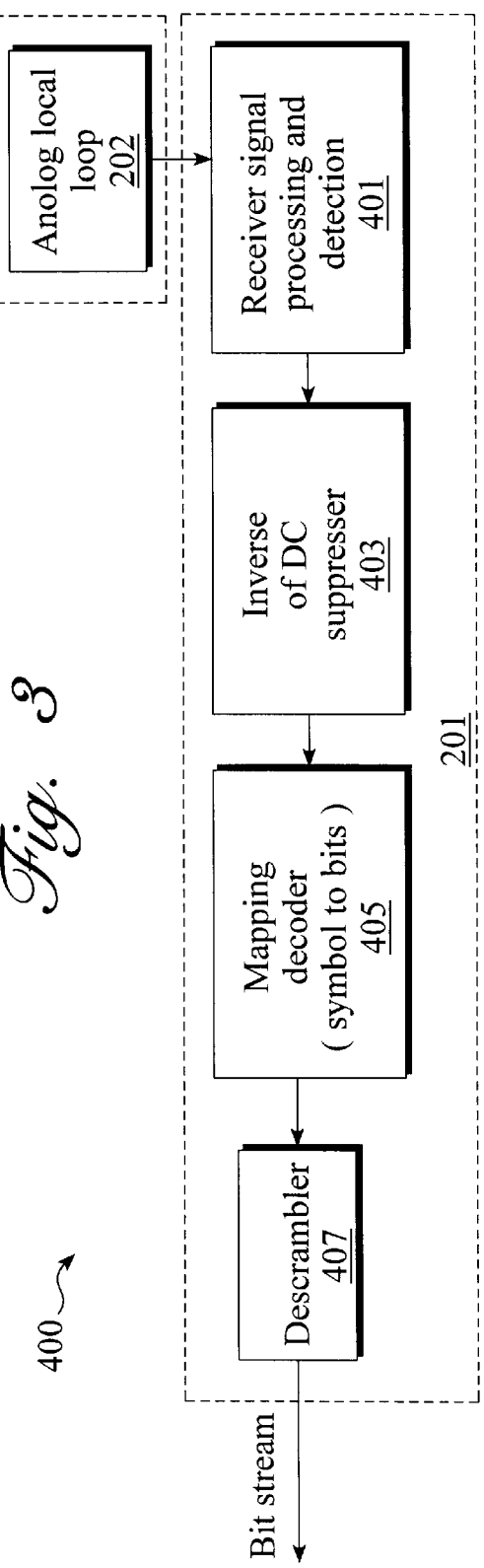
FIG. 4 is a block diagram of a receiver for a subscriber-site 56 k modem communication system according to the present invention.

Referring to FIG. 4, receiver side 400 of communication system 200 is shown. On receiver side 400, subscriber site modem 201 receives an analog signal from analog local loop 202. Subscriber site modem 201 includes receiver signal processing and detection circuitry 401 which detects an incoming signal, sends a notification signal to the CPU, and filters, amplifies, and digitizes the incoming signal. Inverse DC suppresser 403 performs the inverse operation of DC suppresser 303 on the digitized incoming signal stream. Mapping decoder 405 performs the inverse mapping operation of mapper 302 to translate symbols to bits. Descrambler 407 performs the inverse operation of scrambler 301 to descramble the incoming bit stream and sends the descrambled bit stream to a location directed by the CPU of PC 102.

Figure 5:
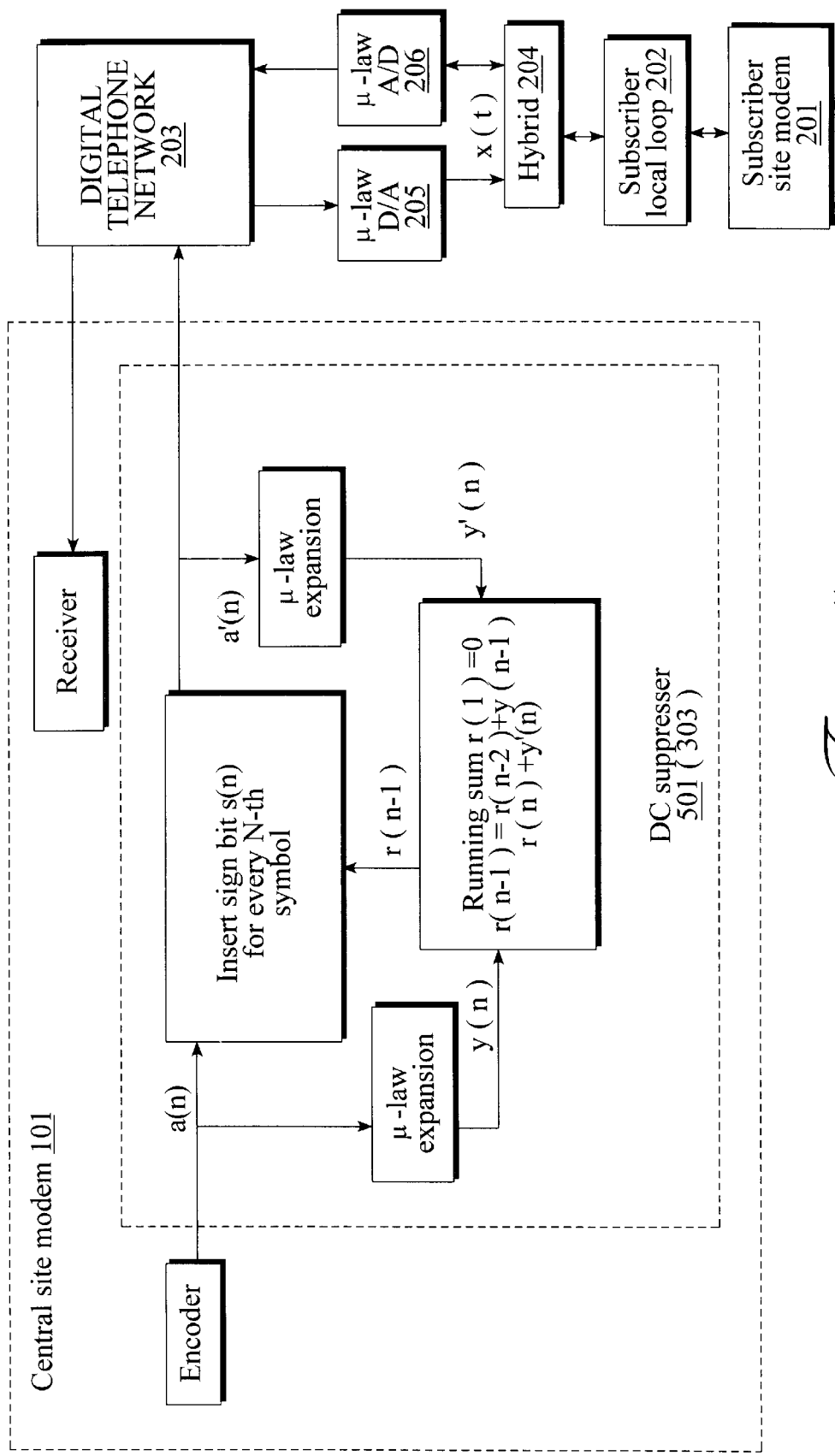
FIG. 5 is a block diagram of a DC suppresser using the first approach according to the present invention.

Referring to FIG. 5, DC suppresser 501 is shown according to a first embodiment of DC suppresser 303 which makes corrections based on the sign of the running sum of all the previously transmitted symbols. The binary number a'(n) defining each symbol corresponds to a positive or negative value, which in turn will correspond to a positive or negative amplitude when converted to an analog signal x(t) at the output of a $\mu$-law D/A 205. The digital sample of this analog signal is equal to y'(n), which is the $\mu$-law expanded version of a'(n). For a digital signal without DC component, the mean value of the binary numbers representing symbols y'(n) is zero. Namely, if the DC suppresser 501 keeps adding all the symbols y'(n) transmitted, for a DC-free signal, the running sum will be around zero, while for a signal with DC component, the running sum will be moving away from 0 in the direction corresponding to the sign of the DC component. To suppress DC and near DC, in every block of N symbols, the DC suppresser 501 computes the running sum as:

$$r(n-1)=r(n-N)+y(n-N+1)+y(n-N+2)+\ldots +y(n-1)$$

where y(i) is the $\mu$-law expanded version of a(i). The DC suppresser 501 then checks the running sum r(n−1). If the running sum r(n−1) is positive, the DC suppresser 501 sends a negative correction symbol a'(n) with all but the sign bit taken from the user data stream, while if the running sum is negative, the DC suppresser 501 sends a positive correction symbol a'(n). The DC suppresser 501 then updates the running sum as:

$$r(n)=r(n-1)+y'(n)$$

where y'(n) is the $\mu$-law expanded version of a'(n).

Figure 7A:
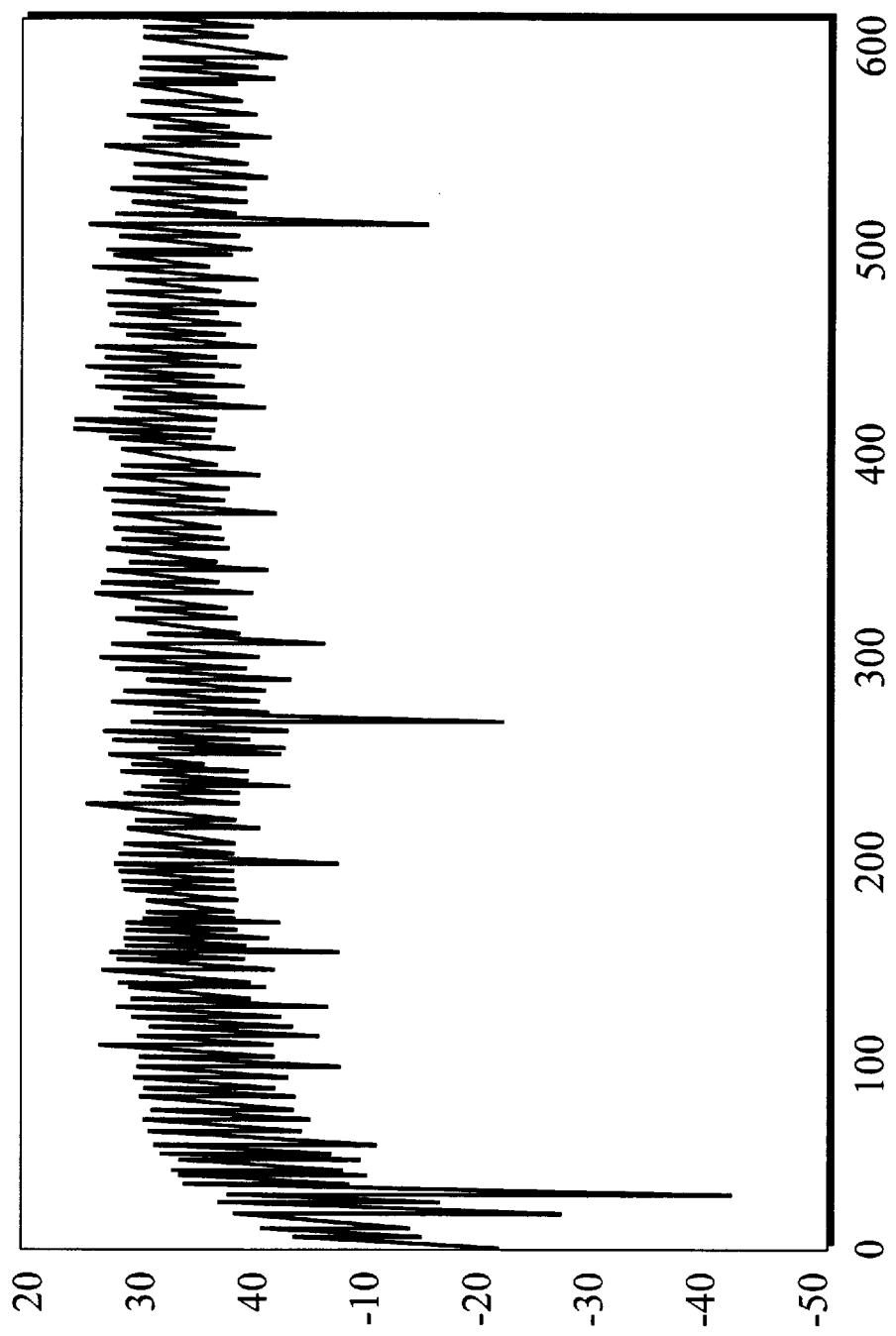
FIG. 7A is an exemplary transmittal signal spectrum according to the first DC suppresser of the present invention.

Such a correction is executed periodically, i.e., the DC suppresser 501 makes one correction in every N symbols. Such a correction scheme results in a suppression of DC and near-DC digital signal components at a cost of 1/IN bit/symbol. The selection of the value for N is a compromise between the cost and the performance of DC and near DC suppression. The smaller the N, the higher the cost and the better the performance. For example, N is equal to 4. Namely, the sign bit of every 4th symbol is not taken from the user data stream, but used to suppress DC and near DC frequency components. Therefore, the cost is only 1/4 bit/symbols, i.e., 2000 bps (bit per second) in data rate. In the receiver, this sign bit is simply discarded. The transmitted signal spectrum for N=4 is shown in FIG. 7A.

From the first approach, it may be noted that to put some constraints upon the signal spectrum, some redundancy has to be added. The approach discussed above can be generalized to the second approach as follows. The data symbols can be divided into frames of size N. In the encoder, check the N symbols in a buffer in each frame and do some invertable transform on these symbols to suppress unwanted DC and very low frequency components; and use M bits in each frame to inform the remote receiver which one out of $2^M$ possible transforms has been used for a particular frame so that the receiver can do the inverse transform to recover the original data symbols. One example is to multiply the data symbol sequence x(i) by a sign transform sequence s(i) consisting only a value +1 or −1 to generate the output sequence y(i)=x(i)s(i). The inverse of the sign transform sequence s(i) happens to be the same as s(i). In the receiver, x(i) is recovered from y(i) by x(i)=y(i)s(i). $2^M$ proper transform sequences may be implemented to effectively suppress DC and near DC frequencies. The cost of such a scheme is M/N bit/symbol. For example, if N=32 and M=5, the cost is 5/32 bit/symbol, i.e., 1250 bps in data rate.

Figure 6:
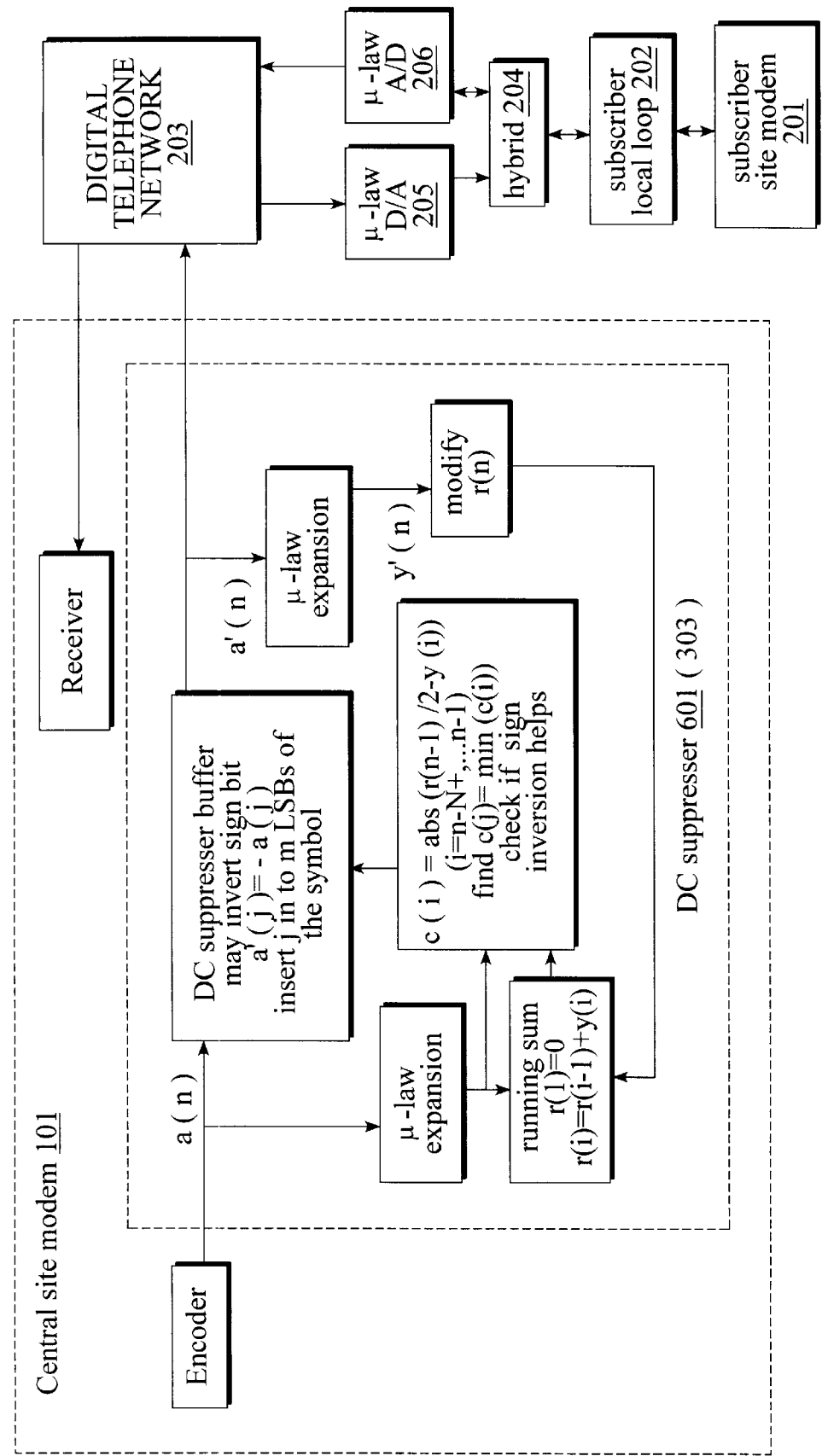
FIG. 6 is a block diagram of a DC suppresser using the second approach according to the present invention.

An example of such a DC suppresser is described below. The block diagram of the second DC suppresser is shown in FIG. 6, block 601.

The data symbols are divided into blocks of size N. Assume N is a power of 2, $N=2^m$. Similar to the first method, the DC suppresser 601 keeps a running sum of all the previously symbols with $\mu$-law expansion:

$$r(n-1)=r(n-N)+y(n-N+1)+y(n-N+2)+\ldots y(n-1).$$

where y(n) is the $\mu$-law expanded version of the encoder output a(n). Note that the latest block of N symbols are taken from a buffer and they have not been sent out yet. The DC suppresser 601 searches through the first N−1 symbols in this block and find the most suitable symbol to invert the sign bit such that the modified running sum is as close to 0 as possible. This is achieved by finding the j-th symbol ($0 \leq j \leq N-2$) which is closest to r(n−1)/2.

$$c(i)=abs(r(n-1)/2-y(i)) \text{ for } i=n-N+1,\ldots n-1$$

find j such that c(j)=min (c(i))

By inverting the sign of a(n−N+1+j), the modified |r(n−1)|, which is |r(n−1)−2*a(n−N+1+j)|, may or may not be smaller than the original |r(n−1)|. If it is smaller, the sign of a(n−N+1+j) is inverted, if it is not smaller, no sign bit inversion will happen and j is set to N−1. Then, the DC suppresser 601 informs the inverse DC suppresser in the remote decoder which symbol, if any, within this block has inverted sign. Obviously, m bits are needed to send this information. These m bits are put to the m LSBs of the last symbol in the block. Namely, in the encoder output a(n), the m LSBs of the last symbol in each block are set to zero, and the m bits representing j for this block are inserted into these m LSBs. Therefore, the modified symbol a'(n) is as follows:

$$a'(n-N+1+i)=a(n-N+1+i) \text{ for } 0\leq i \leq N-2, \text{ but } i \text{ not equal to } j$$

if $|r(n-1)-2*a(n-N+1+j)|<|r(n-1)|$ $$a'(n-N+1+j)=-a(n-N+1+j)$$

else $$a'(n-N+1+j)=a(n-N+1+j)$$

$$j=N-1$$

endif $$a'(n)=a(n)+j$$

After all these modifications, the modified symbols a'(n) are put into the buffer for the transmission.

Finally, r(n−1) is adjusted and r(n) is computed as follows:

if $j<N-1$ $$r(n-1)=r(n-1)-2*y\ (n-N+1+j)$$

endif $$r(n)=r(n-1)+y'(n)$$

where y'(n) is the $\mu$-law expanded version of the final output a'(n).

Since the m LSBs of the last symbol in each block of N symbols do not carry user data information, but send j, the cost is m/N=$LOG_2$(N)/N bit/symbols. For example, if N=8, the cost is 3/8 bit/symbol, i.e., 3 kbps in data rate, or if N=16, the cost is 1/4 bit/symbol, i.e., 2 kbps in data rate.

Figure 7B:
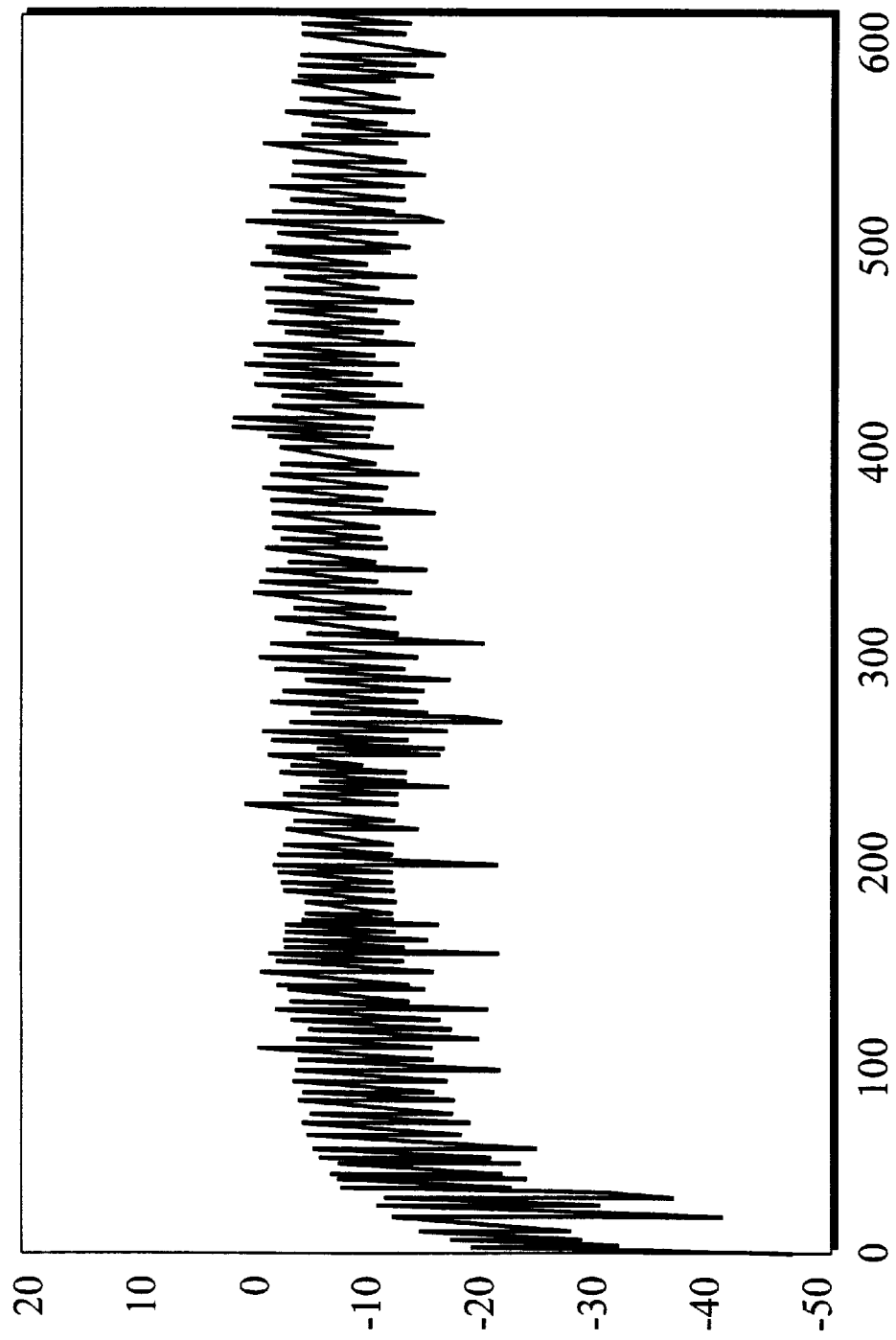
FIG. 7B is an exemplary transmittal signal spectrum according to the second DC suppresser of the present invention.

The transmitted signal spectrum based on the second DC suppresser 601 is shown in FIG. 7B, where the block size is N=16. Comparing FIGS. 7A and 7B, it can be seen that at the same cost in data rate, the second DC suppresser(601) has better performance than the first one(501).

In the receiver, the m LSBs of the last symbol are extracted to form j. If j<N−1, the sign bit for the j-th symbol in this block is inverted. If j=N−1, no sign bit is inverted.

Obviously, in this example, the sign transform sequence s(i) is:

$$s_0=\{-1,1,1,\ldots 1\}$$

$$s_1=\{1,-1,1,\ldots 1\}$$

$$\ldots$$

$$s_{N-2}=\{1,1,1,\ldots -1,1\}$$

$$s_{N-1}=\{1,1,1,\ldots 1\}$$

Referring to FIG. 2, a PCM modem communication system is shown connecting digital modem 101 through PSTN 103 to analog modem 201 connecting to device 102. The symbol rate is 8 kHz. At each symbol period, a set of input bits is operated upon by a scrambler (301). The scrambler output is used by an bits-to-symbol mapper (302) to generate digital symbols, which are sent to the DC suppresser (303). The output symbols of the DC suppresser are sent through digital network 203 to $\mu$-law D/A 205 and converted into analog signals.

$\mu$-law D/A 205 uses a sign-magnitude format with a total of 255 possible input digital values, a subset of which is used by the modem 101.

The bits-to-symbol mapper maps the scrambled bit streams into symbols using some mapping scheme, such as by utilizing the mapping device, method, and system described in a continuation-in-part of U.S. patent application Ser. No. 08/731,474, filed Oct. 16, 1996, now pending, titled Device, System and Method for Modem Communication Utilizing Two-Step Mapping, inventor Gouzhu Long which is hereby incorporated by reference.

In the subscriber-site 56 k modem receiver, conventional modem signal processing techniques can be applied to correctly detect the digital symbols sent by the central-site modem transmitter. For example, an automatic gain control (AGC) unit can be used to compensate the signal attenuation by the local loop; an adaptive equalizer can be used to eliminate the inter-symbol interference; an echo canceller can be used to cancel echo in full-duplex operation; and a sampling rate converter may be used to change the signal sampling rate.

After the detection, an inverse of the DC suppression operation is then performed. For example, if the first DC suppression approach is used, the sign bit of every N-th symbol which is added by the DC suppresser is simply discarded. If the second DC suppression approach is used, one of the $2^M$ possible inverse transform sequences determined by the M bits inserted by the DC suppresser in each frame of N symbols is used to recover the original symbols before the DC suppresser in the central-site modem transmitter. After the inverse operation of the DC suppresser, the mapping decoder and the descrambler operate to obtain the user data stream.

What is claimed is:

1. A method for transmitting digital data over a network, the method comprising the steps of:

receiving a sequence of digital signal values x(1), x(2), . . . , x(n), . . . ;

forming a transformed sequence of digital signal values y(1), y(2), . . . , y(n), . . . , where y(i) is a product x(i)·s(i) and s(i) is a selected value of +1 or −1;

forming a running sum r(n)=r(n−N)+y(n−N+1)+y(n−N+2)+ . . . +y'(n), where N is a selected positive integer that is at least equal to 1;

suppressing low frequency components of the digital signal transmission spectrum for the digital signal sequence {y(k)} (k=1, 2, . . . , n, . . . ) by selecting the values s(n−N+1), s(n−N+2) , . . . , s(n) so that a sequence of at least two running sums {r(k)} satisfies |r(k+1)|≦|r(k)|; and transmitting the sequence of digital signal values{y(k)}.

2. The method of claim 1, further comprising the step of transmitting with said sequence {y(k)} (k=n−N+1, n−N+2, . . . , n) an indicium that indicates said values of at least two consecutive members of said sequence s(n−N+1), s(n−N+2), . . . , s(n).

3. The method of claim 2, further comprising the steps of:

receiving said transmitted sequence {y(k)} and said transmitted indicium;

analyzing said indicium to determine said sequence of values s(n−N+1), s(n−N+2), . . . , s(n); and multiplying said received sequence value y(k) by said value s(k), determined using said indicium, to produce said sequence of values {x(k)}.

4. A system for transmitting digital data over a network, comprising a computer that is programmed:

to receive a sequence of digital signal values x(1), x(2), . . . , x(n), . . . ;

to form a transformed sequence of digital signal values y(1), y(2), . . . , y(n), . . . , where y(i) is a product x(i)·s(i) and s(i) is a selected value of +1 or −1;

to form a running sum r(n)=r(n−N)+y(n−N+1)+y(n−N+2)+ . . . +y'(n), where N is a selected positive integer that is at least equal to 1;

to suppress low frequency components of the digital signal transmission spectrum for the digital signal sequence {y(k)} (k=1, 2, . . . , n, . . . ) by selecting the values s(n−N+1), s(n−N+2) , . . . , s(n) so that a sequence of at least two running sums {r(k)} satisfies |r(k+1)|≦|r(k)|; and to transmit the sequence of digital signal values {y(k)}.

5. The system of claim 4, wherein said computer is further programmed to transmit with said sequence {y(k)} (k=n−

N+1, n−N+2, . . . , n) an indicium that indicates said values of at least two consecutive members of said sequence s(n−N+1), s(n−N+2), . . . , s(n).

6. The system of claim 5, wherein said computer is further programmed:

to receive said transmitted sequence {y(k)} and said transmitted indicium;

to analyze said indicium to determine said sequence of values s(n−N+1), s(n−N+2), . . . , s(n); and to multiply said received sequence value y(k) by said value s(k), determined using said indicium, to produce said sequence of values {x(k)}.

\* \* \* \* \*